US007051223B2

(12) United States Patent
Batchelor et al.

(10) Patent No.: US 7,051,223 B2
(45) Date of Patent: May 23, 2006

(54) SYSTEM, APPARATUS, AND METHOD FOR LIMITING NON-VOLATILE MEMORY

(75) Inventors: Gary William Batchelor, Tucson, AZ (US); Michael Thomas Benhase, Tucson, AZ (US); Enrique Garcia, Tucson, AZ (US); Carl Evan Jones, Tucson, AZ (US); Trung Le, Morgan Hill, CA (US)

(73) Assignee: International Business Madnine Corporation, Armonk, NY (US)

( * ) Notice: Subject to any disclaimer, the term of this patent is extended or adjusted under 35 U.S.C. 154(b) by 212 days.

(21) Appl. No.: 10/677,152

(22) Filed: Sep. 30, 2003

(65) Prior Publication Data

US 2005/0071697 A1 Mar. 31, 2005

(51) Int. Cl.
*G06F 12/16* (2006.01)

(52) U.S. Cl. .................. 713/340; 713/320; 713/322; 713/323; 713/324; 713/330

(58) Field of Classification Search ........ 713/322–324, 713/330, 340
See application file for complete search history.

(56) References Cited

U.S. PATENT DOCUMENTS

| 5,625,237 | A |   | 4/1997 | Saeki et al. .................... 307/48 |
| 5,822,600 | A |   | 10/1998 | Hallowell et al. ....... 395/750.08 |
| 5,920,728 | A | * | 7/1999 | Hallowell et al. ........... 713/340 |
| 6,035,347 | A | * | 3/2000 | Beardsley et al. ............ 710/52 |
| 6,205,521 | B1 | * | 3/2001 | Schumann ................... 711/144 |
| 6,304,981 | B1 |   | 10/2001 | Spears et al. .................. 714/24 |
| 6,643,786 | B1 | * | 11/2003 | Kawakami ................... 713/340 |
| 6,725,397 | B1 | * | 4/2004 | Emberty et al. ............... 714/24 |
| 6,792,551 | B1 |   | 9/2004 | Dai ............................ 713/320 |
| 6,829,724 | B1 | * | 12/2004 | Farabaugh et al. ............ 714/14 |
| 6,839,287 | B1 | * | 1/2005 | Brucklmayr et al. ... 365/189.05 |
| 2003/0046503 | A1 |   | 3/2003 | Park ........................... 711/162 |
| 2004/0054851 | A1 | * | 3/2004 | Acton et al. ................. 711/118 |

FOREIGN PATENT DOCUMENTS

JP 63155213 6/1988

* cited by examiner

*Primary Examiner*—A. Elamin
(74) *Attorney, Agent, or Firm*—Kunzler & Associates

(57) ABSTRACT

An apparatus for limiting volatile computer memory based on available energy in an auxiliary power source comprises an energy monitor module configured to determine an amount of available energy in the auxiliary power source. Also provided is a memory status module configured to determine an amount of volatile computer memory allocated for use in a computer and a memory adjustment module configured to adjust the amount of volatile computer memory allocated for use in the computer based on the amount of available energy in the auxiliary power source. A startup module may be configured to allow the computer to begin moving data normally when the memory adjustment module limits volatile computer memory allocated for use by the computer to a minimum level and the energy monitor module determines that the amount of available energy in the auxiliary power source has reached a minimum level capable of transferring the volatile computer memory allocated for use by the computer to non-volatile computer memory during a computer shutdown.

18 Claims, 7 Drawing Sheets

SYSTEM, APPARATUS, AND METHOD FOR LIMITING NON-VOLATILE MEMORY

BACKGROUND OF THE INVENTION

1. Field of the Invention

The present invention relates to volatile memory in a computer, and more particularly, to limiting volatile computer memory based on available energy of an auxiliary power source.

2. Description of the Related Art

As financial, scientific, medical, and other critical data are being integrated with computers and computer networks, reliability and availability of the data continues to be important. Loss of data may have severe negative consequences for these and other users of a computer system.

Backup systems reduce the possibility of data loss. Natural disasters such as fire, lightning, hurricanes, etc., and man made disasters such as civil unrest, computer hacker attacks, and terrorist attacks can also affect computer networks and increase the need for backup systems and for data to be stored remotely. Storing data at distances from a few miles to thousands of miles is often required to overcome many disaster scenarios.

Backup systems, however, are not the complete answer for prevention of lost data. This is because data that is stored in a computer's volatile memory can be lost if power is interrupted. Even portions of data that are stored in a volatile memory in just seconds can be devastating to lose for some users. When a power interruption occurs, data stored in volatile memory, such as a read cache or write cache, is lost unless steps are taken to prevent such data loss. In response to the problem of volatile memory loss, computer systems have been developed with batteries, uninterruptible power supplies, and other energy storage means to keep computer systems running long enough to transfer data that is temporarily in the volatile memory to the permanent non-volatile memory. Non-volatile memory can take the form of a hard disk, a tape, a flash memory, and other types of memory that maintains the contents in a retrievable form within the memory without an applied source of power.

Typically, when an auxiliary power source is provided in the form of a battery, the battery is designed to be of sufficient capacity to adequately power the computer while the steps required to shutdown a computer are performed. Typically, a primary step includes transferring the contents of the volatile memory to a non-volatile memory. If, however, the battery is not charged sufficiently to perform all of the steps necessary for a complete shutdown operation, data in the computer's volatile memory may be lost when a primary power source interruption occurs.

The current state of the art is to monitor the auxiliary power source batteries to ensure sufficient energy is present in the batteries to be able to fully save data stored in the allocated cache or volatile memory upon the loss of power supplied to the computer. If the available energy in an auxiliary power source is in danger of dropping below a level required to shut down the computer and save all of the data stored on the volatile memory, the computer will initiate a shutdown process to ensure that the data in the volatile computer memory is saved. However, while this process is effective, it is inefficient because there will be times when the computer will initiate the shutdown process during normal operations.

During a computer startup process, typically a computer's auxiliary power source is evaluated to determine whether enough energy exists to save data that will be stored in the volatile computer memory that is fully allocated for use during normal operation. The present state of the art is such that full allocation of volatile memory is set by a user and cannot be varied automatically based on available energy in the auxiliary power source.

If the computer determines that the auxiliary power source does not have enough energy to save the data stored in the fully allocated volatile computer memory, the computer startup process will be delayed for minutes or even hours while the auxiliary power source is charged to a level required to save the fully allocated volatile computer memory. In a critical application, a delay caused by waiting for the auxiliary power source to be charged is detrimental to the computer user since an application executing on the computer cannot be used.

What is needed is a process, apparatus, and system that limit allocated volatile computer memory based on available energy in an auxiliary power source. Beneficially, such a process, apparatus, and system would determine the available energy of the auxiliary power source and limit volatile computer memory allocated for use. In addition, during a computer startup process, the status of available energy in an auxiliary power source would be evaluated, and volatile computer memory would be limited such that the computer could be put into use earlier than if the startup process had to wait for the auxiliary power source to be charged to a level needed to store data for a fully allocated volatile computer memory. In other words, the computer would be allowed to operate at a reduced operation level that matches the amount of available battery power capable of saving the data in the volatile memory. As the battery power increases, the relative operational speed of the computer will gradually increase until reaching full operational levels.

BRIEF SUMMARY OF THE INVENTION

The present invention has been developed in response to the present state of the art, and in particular, in response to the problems and needs in the art that have not yet been fully solved by currently available computer systems that do not allow allocation of volatile computer memory based on available energy in an auxiliary power source. Accordingly, the present invention has been developed to provide a process, apparatus, and system for limiting allocated volatile computer memory based on available energy in an auxiliary power source that overcome many or all of the above-discussed shortcomings in the art.

The apparatus for limiting allocated volatile computer memory based on available energy in an auxiliary power source is provided with a logic unit containing a plurality of modules configured to functionally execute the necessary steps to limit volatile computer memory based on an auxiliary power source energy level. These modules in the described embodiments include an energy monitor module configured to determine an amount of available energy in an auxiliary power source, a memory status module configured to determine an amount of volatile computer memory allocated for use in a computer, and a memory adjustment module configured to adjust the amount of volatile computer memory allocated for use in the computer based on the amount of available energy in the auxiliary power source.

In one embodiment, adjusting the amount of volatile computer memory allocated for use in the computer further comprises limiting the amount of volatile computer memory allocated for use by the computer to an amount of volatile computer memory that can be transferred to non-volatile computer memory during a computer shutdown using the amount of available energy in the auxiliary power source. In another embodiment, the apparatus includes a startup module configured to allow the computer to begin moving data normally when the memory adjustment module has limited volatile computer memory allocated for use by the computer to a minimum level and the energy monitor module has determined that the amount of available energy in the auxiliary power source has reached a minimum level capable of transferring the volatile computer memory allocated for use by the computer to non-volatile computer memory during a computer shutdown.

In a one embodiment, the auxiliary power source is an internal power storage device located within the computer. In yet another embodiment, the auxiliary power source is an external power storage device located external to the computer.

A system of the present invention is also presented for limiting volatile computer memory based on an auxiliary power source energy level The system may be embodied in a computer having an energy monitor module configured to determine an amount of available energy in an auxiliary power source. Also provided is a memory adjustment module configured to adjust the amount of volatile computer memory allocated for use in the computer based on the amount of available energy in the auxiliary power source. The system may include a memory status module configured to determine an amount of volatile computer memory allocated for use in a computer. Additionally, the system may include a startup module configured to allow the computer to begin moving data normally when the memory adjustment module has limited volatile computer memory allocated for use by the computer to a minimum level and the energy monitor module has determined that the amount of available energy in the auxiliary power source has reached a minimum level capable of transferring the volatile computer memory allocated for use by the computer to non-volatile computer memory during a computer shutdown.

One variation of the system may include a computer network connected to the computer and to other computer system components such as a file server, a workstation, a printer and other peripheral devices. In another embodiment, the system may include a storage area network (SAN) connecting memory storage devices such as an array of hard drives, tape storage, a storage area network controller, and the like.

A method of the present invention is also presented for limiting volatile computer memory based on the available energy of an auxiliary power source. The method in the disclosed embodiments substantially includes the steps necessary to carry out the functions presented above with respect to the operation of the described apparatus and system. In one embodiment, the method includes determining an amount of available energy in an auxiliary power source, determining an amount of volatile computer memory allocated for use in a computer, and adjusting the amount of volatile computer memory allocated for use in the computer based on the amount of available energy in the auxiliary power source.

Adjusting the amount of volatile computer memory allocated for use in the computer may include limiting the amount of volatile computer memory allocated for use by the computer to an amount of volatile computer memory that can be transferred to non-volatile computer memory during a computer shutdown using the amount of available energy the auxiliary power source. The method also may include allowing the computer to begin moving data normally after limiting volatile computer memory allocated for use by the computer to a minimum level and determining that the amount of available energy in the auxiliary power source has reached a minimum level capable of transferring the volatile computer memory allocated for use by the computer to non-volatile computer memory during a computer shutdown.

The methods presented may comprise computer readable storage medium including computer readable code configured to carry out the described method. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
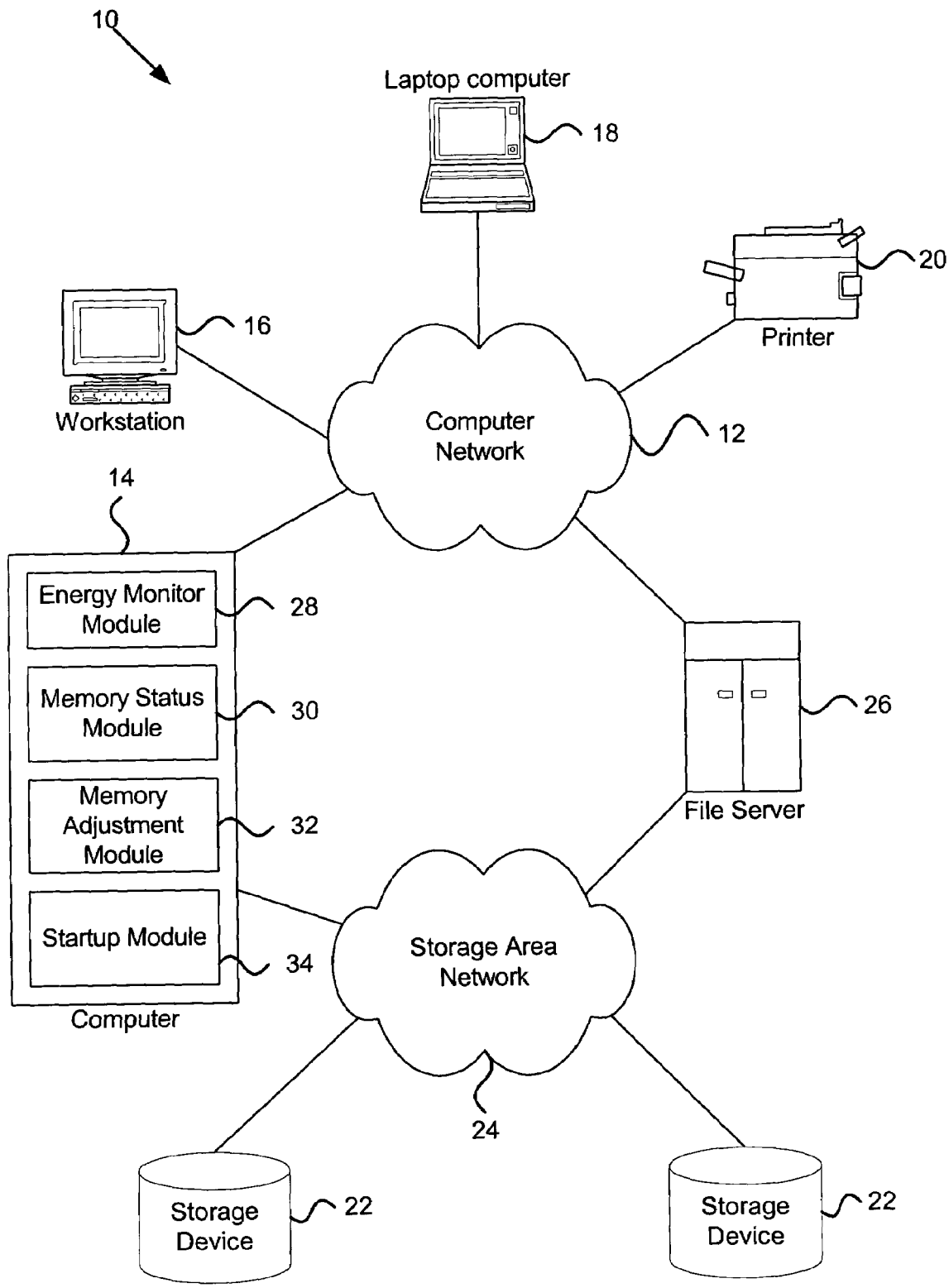
FIG. 1 is a schematic block diagram illustrating one embodiment of a computer system in accordance with the present invention.

FIG. 1 depicts one embodiment of a system 10 where the present invention may be applicable. A computer network 12 is shown connected with a computer 14, a computer workstation 16, and other computers such as a laptop computer 18, a printer 20, and other computer components. In one embodiment, the system may include storage devices connected to the computer system 10 through a storage area network (SAN) 24.

In accordance with one embodiment of the present invention, the computer 14 includes several modules as described herein. An energy monitor module 28 is configured to determine an amount of available energy in an auxiliary power source. A memory status module 30 is configured to determine an amount of volatile computer memory allocated for use in a computer 14. A memory adjustment module 32 that is configured to adjust the amount of volatile computer memory allocated for use in the computer 14 based on the amount of available energy in the auxiliary power source.

In an alternate embodiment, the computer 14 may include both a startup module 34 and the energy monitor module 28. The startup module 34 may be configured to allow the computer to begin moving data normally after the memory adjustment module has limited volatile computer memory allocated for use by the computer to a minimum level and the energy monitor module 28 has determined that the amount of available energy in the auxiliary power source has reached a minimum level capable of transferring the volatile computer memory allocated for use by the computer to non-volatile computer memory during a computer shutdown. In one embodiment, the amount of volatile computer memory allocated for use in the computer 14 is limited to to an amount of volatile computer memory that can be transferred to non-volatile computer memory during a computer shutdown using the amount of available energy in the auxiliary power source.

Figure 2:
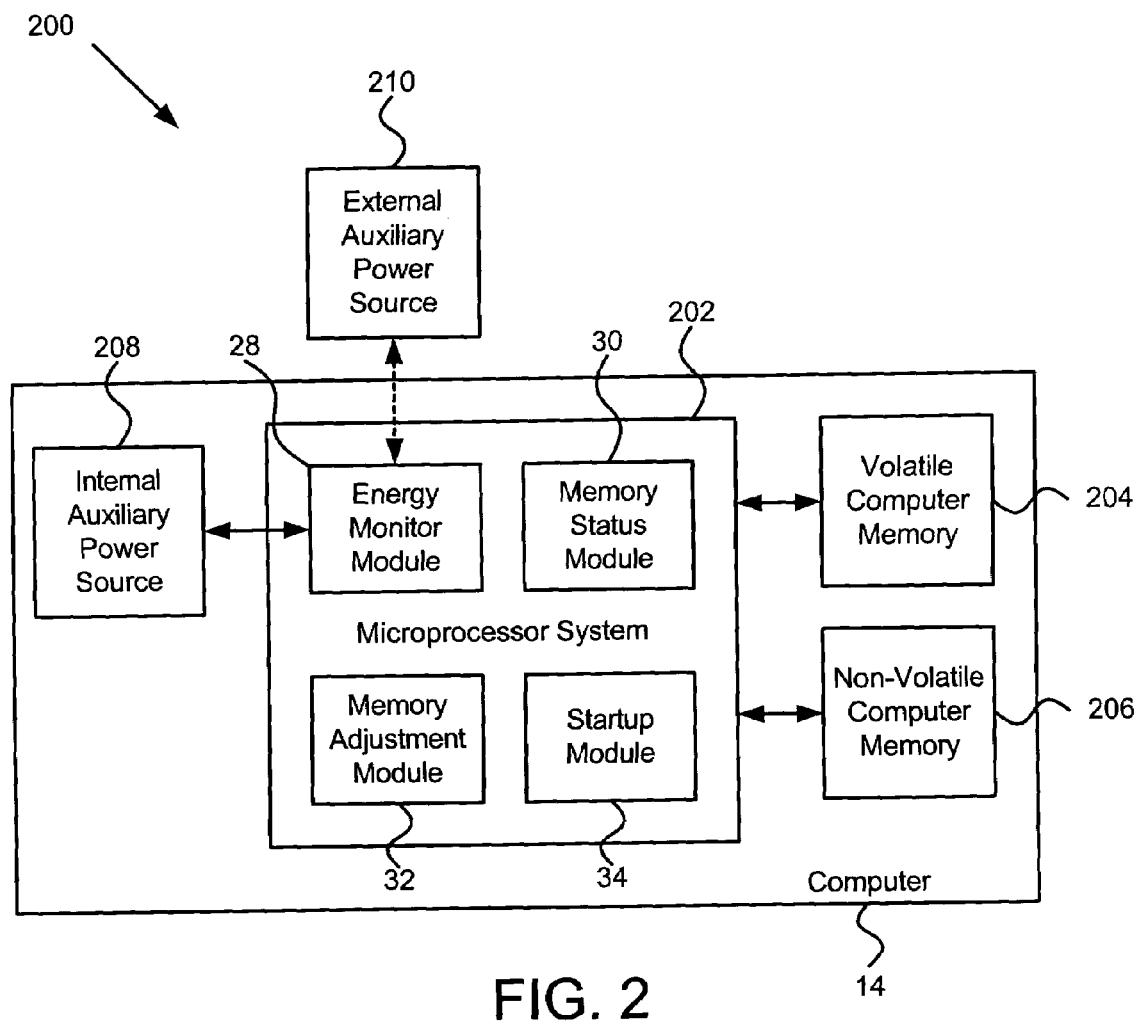
FIG. 2 is a schematic block diagram illustrating one embodiment of an apparatus for limiting volatile computer memory in accordance with the present invention.

FIG. 2 depicts a computer system 200 configured to limit volatile computer memory based on an auxiliary power source energy level. The depicted computer system 200 includes a computer 14 that includes a microprocessor 202 or another suitable logic device. The microprocessor 202 operates using software having a plurality of functional models. An energy monitor module 28 is preferably configured to determine an amount of available energy in an auxiliary power source. A memory status module 30 is preferably configured to determine an amount of volatile computer memory 204 allocated for use in the computer 14. A memory adjustment module 32 is preferably configured to adjust the amount of volatile computer memory 204 allocated for use in the computer 14 based on the amount of available energy in the auxiliary power source. The energy monitor module 28, the memory status module 30, and the memory adjustment module 32 may execute in the computer 14 and outside the microprocessor 202 or may even reside outside the computer 14. In one embodiment, the memory adjustment module is configured to limit the amount of volatile computer memory 204 allocated for use by the computer 14 to an amount of volatile computer memory 204 that can be transferred to non-volatile computer memory 206 during a computer 14 shutdown using the amount of available energy in the auxiliary power source.

In one embodiment, the auxiliary power source is an internal auxiliary power source 208 that resides in the computer 14. In another embodiment, the auxiliary power source is an external auxiliary power source 210 that resides outside the computer 14. The auxiliary power source may be a battery system or an uninterruptible power supply system or other source of energy storage. The auxiliary power source provides energy to the computer 14 when a primary power source is not present.

Figure 3:
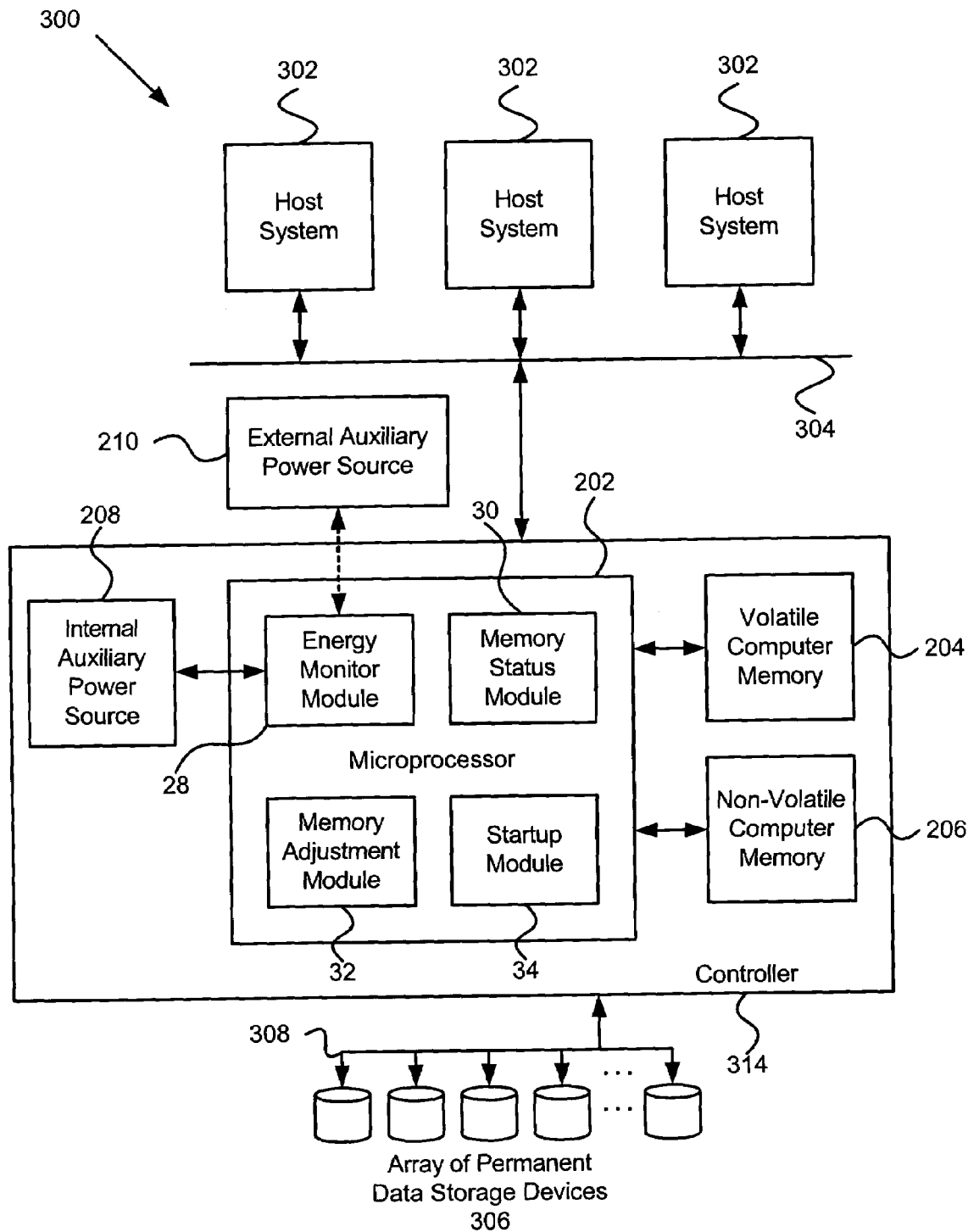
FIG. 3 is a schematic block diagram illustrating an alternative embodiment of an apparatus for limiting volatile computer memory in accordance with the present invention.

FIG. 3 illustrates an alternate embodiment of the present invention where the computer 14 of FIG. 2 is employed as a storage area network controller 314 in a computer system 300. As shown in FIG. 3, the controller 314 includes a microprocessor 202 or another suitable logic device that contains therein an energy module 28, a memory status module 30, a memory adjustment module 32, and a startup module 34. The controller 314 includes a volatile computer memory 204 as well as non-volatile computer memory 206. Nonvolatile or "permanent" memory may include an array of permanent storage devices 306, a hard disk on the computer 14, tape storage, or the like.

The storage area network controller (the computer 14) maybe connected to an array of host computers 302 through a computer network 304. The host computers 302 may be in one or more locations and may execute one or more applications that may store data on the storage area network. The computer 14 may also be connected to an array of permanent storage devices 306 through a storage area network 308. The array of permanent storage devices 306 may comprise hard disk storage devices, tape disk storage devices, or the like.

Figure 4:
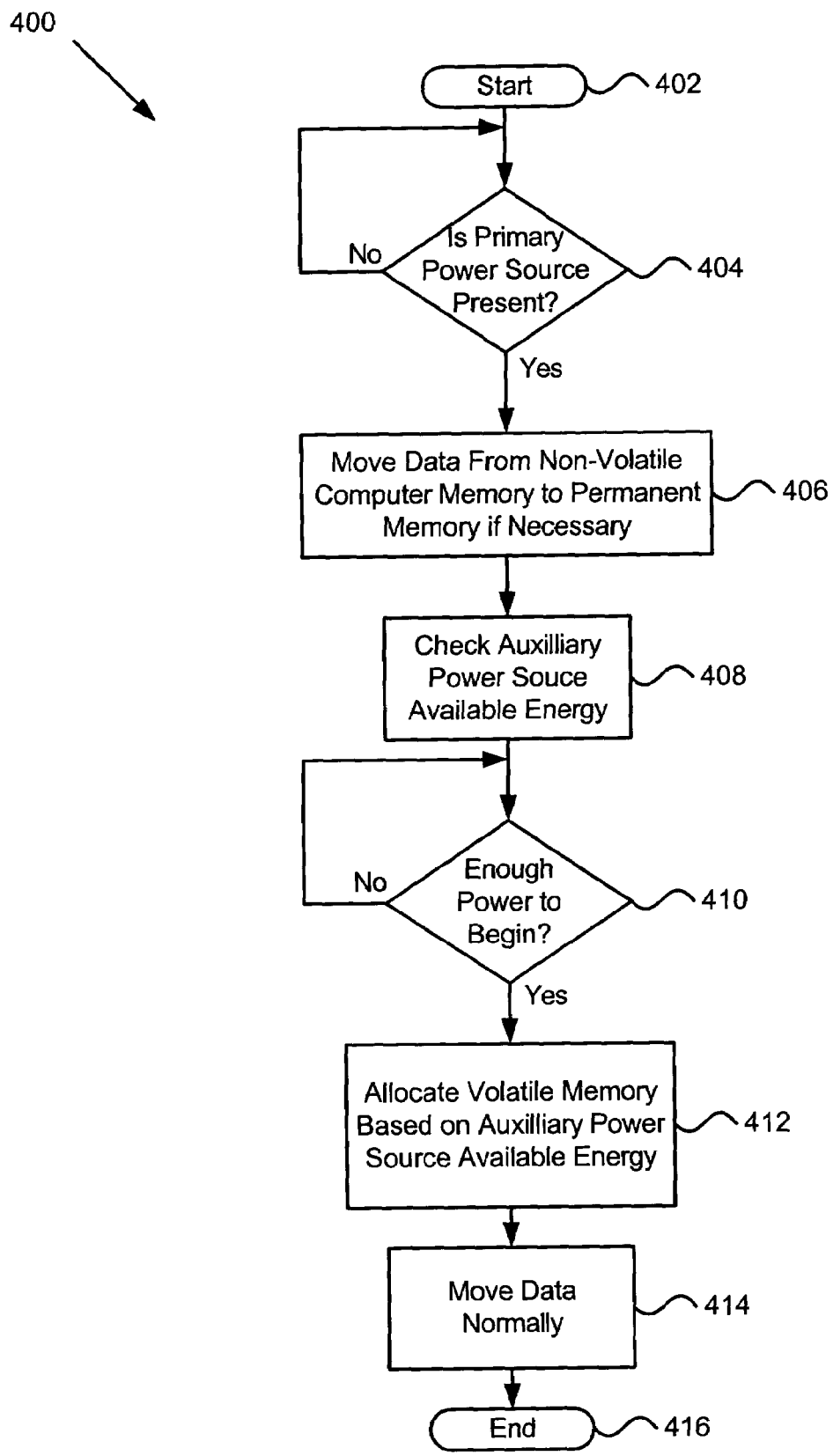
FIG. 4 is a schematic flow chart diagram illustrating one embodiment of a computer startup method in accordance with the present invention.

FIG. 4 depicts a schematic flow chart diagram illustrating one embodiment of a computer startup method 400 in which the volatile computer memory 204 is limited according to available power under the present invention. The method 400 is one embodiment of a method of operation of the apparatus and system of FIGS. 1 and 2, but may also be conducted independent thereof. As depicted, the method 400 starts 402 and the startup module 34 in the computer 14 determines 404 whether a primary power source is present. The primary power source is preferably an AC power source, but may be a DC power source or another type of power source.

If the primary power source is present, the startup module 34 moves 406 data temporarily stored in the local non-volatile computer memory 206 during the last computer shutdown to permanent memory if necessary. If no data was moved from the volatile computer memory 204 to the non-volatile computer memory 206 during the previous computer shutdown, then this step 406 is not necessary.

The energy monitor module 28 then determines 408 an amount of available energy in the auxiliary power source. The memory status module 30 then may determine 410 if there is enough available energy from the auxiliary power source to begin computer 14 operations. In accordance with the present invention, the startup module 34 may reduce the allocation of volatile computer memory 204 at the computer 14 startup from the amount allocated during normal operation to a minimal level that allows the computer 14 to operate, but at non-optimal level.

Figure 5:
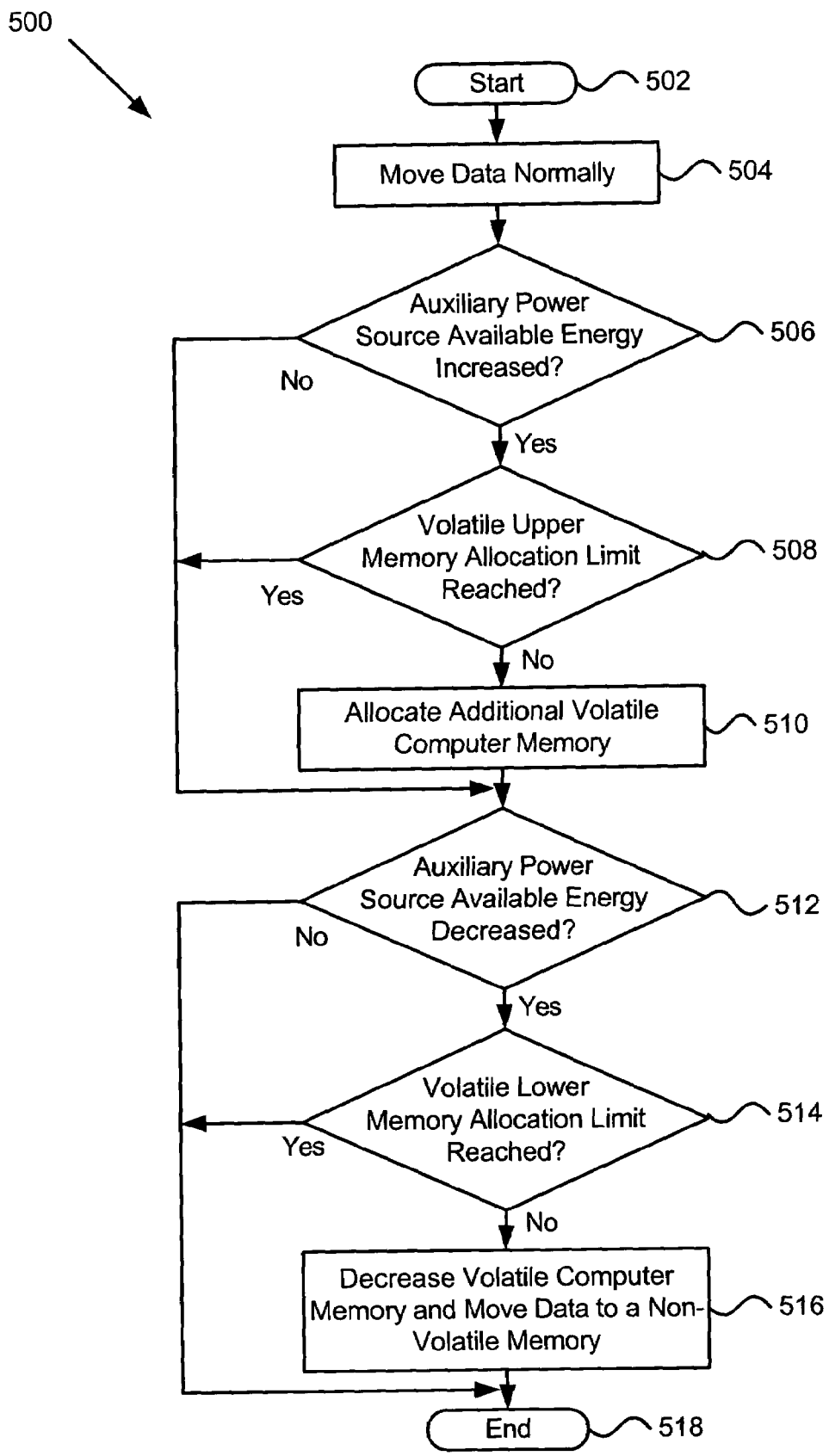
FIG. 5 is a schematic flow chart diagram illustrating one embodiment of a method for limiting volatile computer memory in accordance with the present invention.

The determination 410 of adequate energy in the auxiliary power source may be based on the amount of available energy adequate for moving the contents of the volatile computer memory 204 to the non-volatile computer memory 206, as well as other functions necessary for computer shutdown. If the auxiliary power source does not have enough available energy to begin operation of the computer 14, the computer 14 continues to increase the available energy in the auxiliary power source until there is enough available energy to commence operation of the computer 14. Once the energy monitor module 28 has determined 410 that there is sufficient available energy in the auxiliary power source to begin operation of the computer 14, the memory adjustment module 32 allocates 412 volatile computer memories 204 at a minimum level. The startup module 34 then allows 414 data to move normally in the computer 14, and the method 400 ends. The computer 14 may initially operate at a non-optimal level immediately after the startup process FIG. 5 depicts a schematic flow chart diagram illustrating one embodiment of a method 500 of operation of the computer 14 after startup in accordance with the present invention. The method 500 is a further embodiment of a method of operation of the apparatus and system of FIGS. 1 and 2, but may also be conducted independent thereof. The illustrated method 500 starts 502, after which the computer 14 moves 504 data normally. The energy monitor module 28 then determines 506 whether the available energy in the auxiliary power source has increased. If the available energy in the auxiliary power source has increased, the memory status module 30 determines 508 whether the upper limit for allocation of volatile computer memory 204 has been reached. If not, the memory adjustment module 32 allocates 510 additional volatile computer memory 204 for use by the computer 14. The amount of volatile computer memory 204 allocated for use is limited to an amount for which the available energy in the auxiliary power source can move all data therein to the non-volatile computer 206 after an external power loss.

If the available energy in the auxiliary power source has not increased, or if the upper limit of the allocation of volatile computer memory 204 has not been reached, the method 500 does not allocate additional volatile computer memory 204. The energy monitor module 28 then determines 512 whether the available energy in the auxiliary power source has decreased. If so, the memory status module 30 then determines 514 whether a lower limit of allocation of volatile computer memory 204 has been reached. If not, the memory adjustment module 32 reduces 516 the allocation of volatile computer memory 204 and the computer 14 moves data affected by the reduction in volatile computer memory 204 to non-volatile memory 204 or, alternatively, to a permanent memory, and the method 500 ends 518. If the energy monitor module 28 determines 512 that available power in the auxiliary power source has not decreased, and if the memory status module 30 determines 514 that a lower limit for allocation of volatile computer memory 204 has not been reached, the method 500 ends 518 without decreasing allocated volatile computer memory 516. The method 500 repeats as long as the computer 14 is operating.

Figure 6:
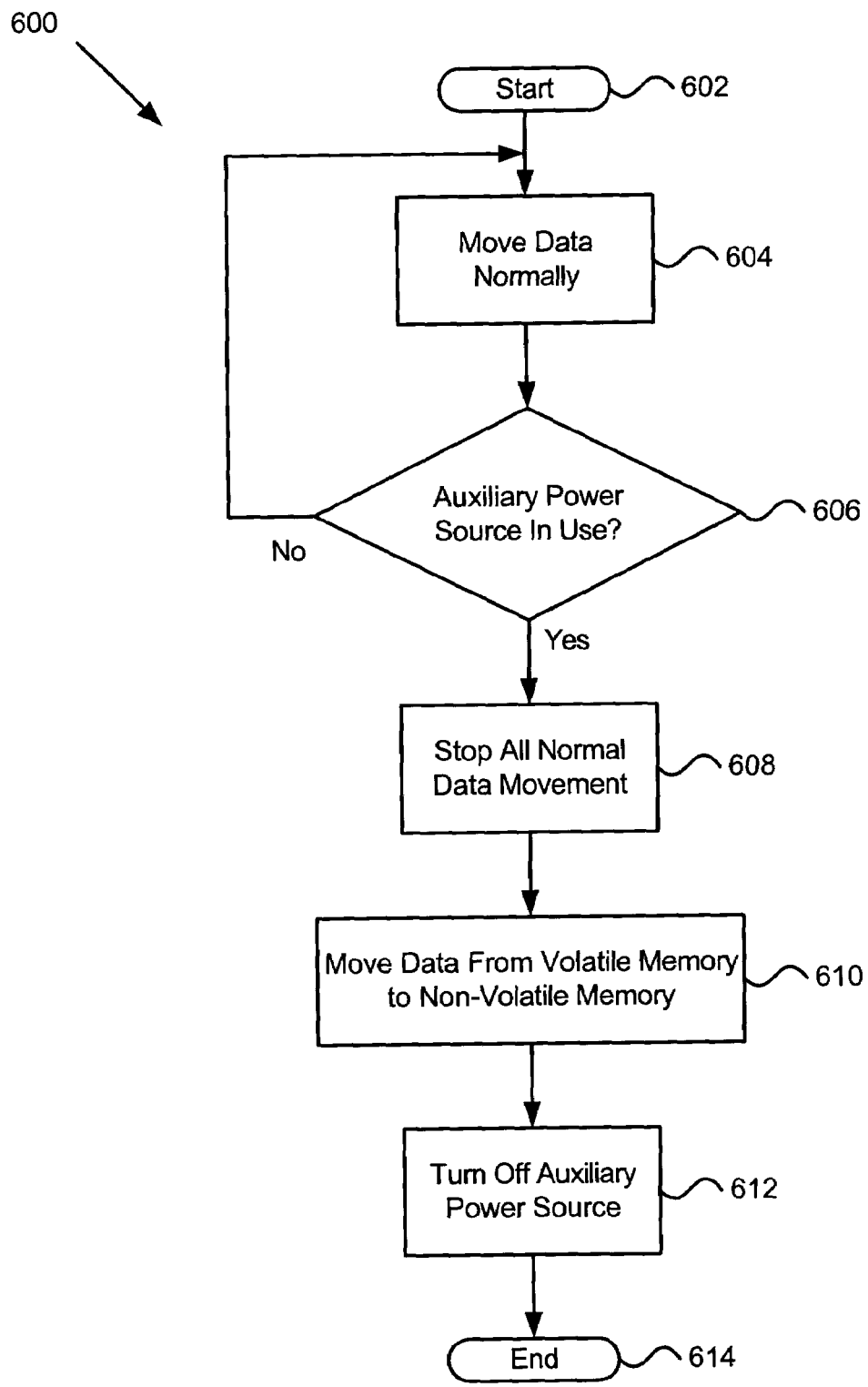
FIG. 6 is a schematic flow chart diagram illustrating one embodiment of a method for shutting down a computer in accordance with the present invention.

FIG. 6 depicts a schematic flow chart diagram illustrating one embodiment of a method 600 of computer 14 shutdown. The method 600 is a further embodiment of a method of operation of the apparatus and system of FIGS. 1,2 and 3, but may also be conducted independent thereof. As depicted, the method 600 starts 602, and the computer 14 moves 604 data normally. The computer determines 606 if the auxiliary power source is in use. Typically, the auxiliary power source is in use if a primary power source is not in use. If the auxiliary power source is not in use, the computer 14 continues to move 604 data normally.

If the auxiliary power source is in use, the computer 14 stops 608 all normal data movement. The computer 14 then moves 610 data from the volatile computer memory 204 to the non-volatile computer memory 206 and then turns 612 off the auxiliary power source, and the method 600 ends 614.

Figure 7:
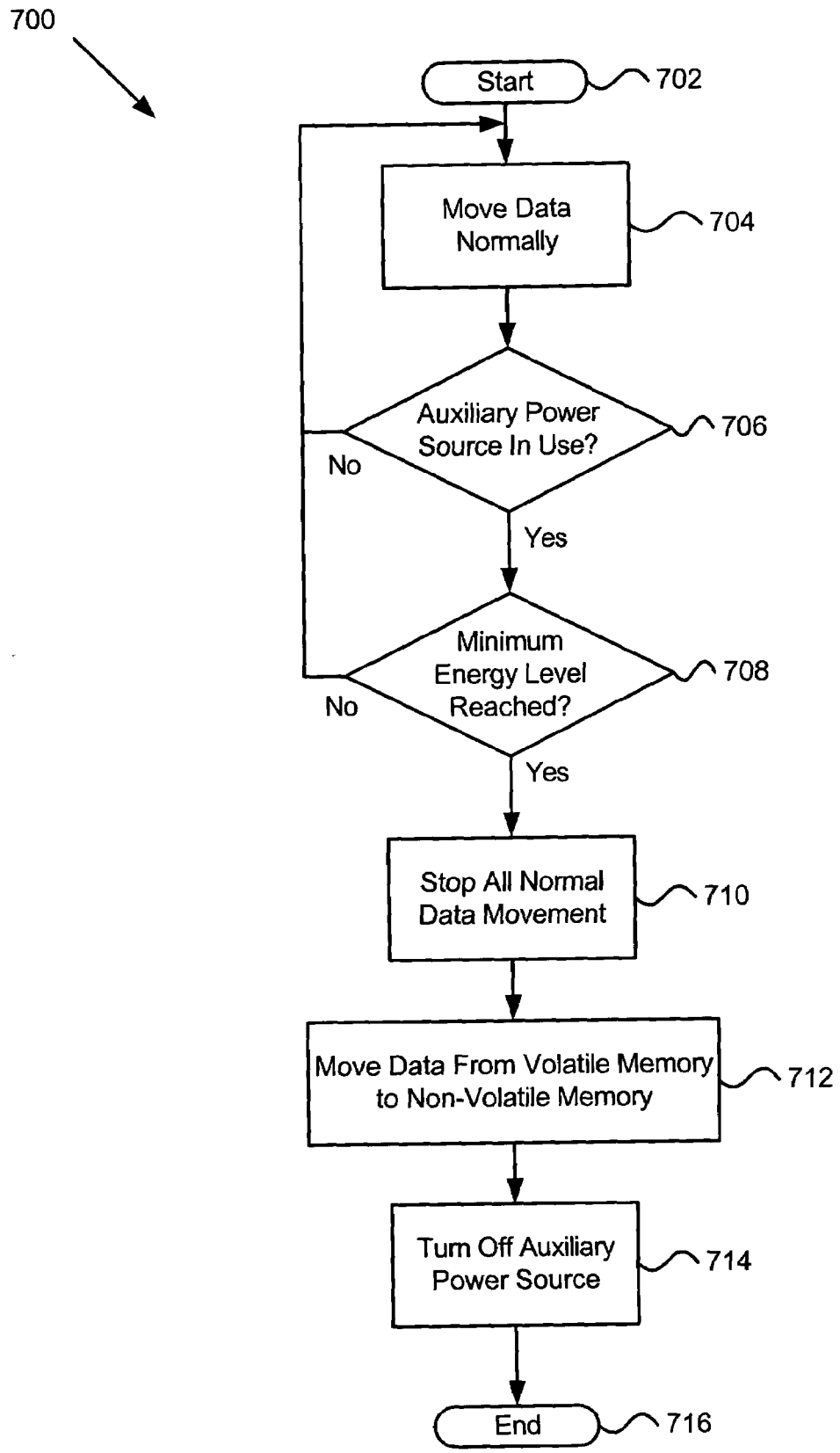
FIG. 7 is a schematic flow chart diagram illustrating an alternate embodiment of a method for shutting down a computer in accordance with the present invention.

FIG. 7 depicts a schematic flow chart diagram illustrating another embodiment of a method 700 of computer 14 shutdown. The method 700 is a further embodiment of a method of operation of the apparatus and system of FIGS. 1, 2 and 3, but may also be conducted independent thereof. The method 700 is applicable for a computer 14 that includes an auxiliary power source capable of operating the computer 14 for a time before the auxiliary power source reaches a minimum available energy level necessary to save data in the volatile computer memory 204 and shut down the computer 14.

The method 700 starts 702, and the computer 14 moves 704 data normally. The computer 14 determines 706 whether the auxiliary power source is in use. Again, typically, if the auxiliary power source is in use, a primary power source is not in use. If the auxiliary power source is not in use, the computer 14 continues to move 704 data normally.

If the auxiliary power source is in use, the energy monitor module 28 determines 708 whether the auxiliary power source has reached a minimum energy level. If not, the computer 14 continues to move 704 data normally. During normal operation of the computer 14, the method 500 depicted in FIG. 5 continues to execute. If the energy monitor module 28 determines 708 that the auxiliary power source has reached a minimum energy level, the computer 14 stops 710 all normal data movement. The computer 14 then moves 712 data from the volatile computer memory 204 to the non-volatile computer memory 206 and then turns 714 off the auxiliary power source, and the method 700 ends 716.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for limiting volatile computer memory based on available energy in an auxiliary power source, the apparatus comprising:
   an energy monitor module configured to determine an amount of available energy in an auxiliary power source;
   a memory status module configured to determine an amount of volatile computer memory allocated for use in a computer;
   a memory adjustment module configured to adjust the amount of volatile computer memory allocated for use in the computer based on the amount of available energy in the auxiliary power source; and
   a startup module configured to allow the computer to begin moving data normally during a startup operation when the memory adjustment module has limited volatile computer memory allocated for use by the computer to a minimum level and the energy monitor module has determined that the amount of available energy in the auxiliary power source has reached a level capable of powering a transferal of the full contents of the volatile computer memory allocated for use by the computer by the memory adjustment module to non-volatile computer memory during a computer shutdown.

2. The apparatus of claim 1, wherein the memory adjustment module is configured to adjust the amount of volatile computer memory allocated for use in the computer further by adjusting the amount of volatile computer memory allocated for use by the computer to an amount of volatile computer memory the contents of which can be fully transferred to non-volatile computer memory during a computer shutdown using the amount of available energy in the auxiliary power source.

3. The apparatus of claim 1, wherein the auxiliary power source is an internal power storage device located within the computer.

4. The apparatus of claim 1, wherein the auxiliary power source is an external power storage device located external to the computer.

5. The apparatus of claim 1, further comprising a transfer module configured to transfer data stored in non-volatile memory to permanent memory upon application of power to the computer.

6. A system for limiting volatile computer memory based on available energy in an auxiliary power source, the apparatus comprising:
a computer having volatile computer memory;
an energy monitor module configured to determine an amount of available energy in an auxiliary power source;
a memory adjustment module configured to adjust an amount of the volatile computer memory that is allocated for use in the computer, the adjustment based on the amount of available energy in the auxiliary power source; and
a startup module configured to allow the computer to begin moving data normally during a startup operation when the memory adjustment module has limited volatile computer memory allocated for use by the computer to a minimum level and the energy monitor module has determined that the amount of available energy in the auxiliary power source has reached a level capable of powering a transferal of the full contents of the volatile computer memory allocated for use by the computer by the memory adjustment module to non-volatile computer memory during a computer shutdown.

7. The system of claim 6, further comprising a memory status module configured to determine an amount of volatile computer memory allocated for use in a computer.

8. The system of claim 6, further comprising a computer network connecting the computer to other computer system components.

9. The system of claim 8, wherein the network comprises a storage area network connecting memory storage devices.

10. The system of claim 8, wherein the other computer system components comprise a file server, a printer, and computer workstations.

11. A method for limiting volatile computer memory based on available energy in an auxiliary power source, the method comprising:
determining an amount of available energy in an auxiliary power source;
determining an amount of volatile computer memory allocated for use in a computer;
adjusting the amount of volatile computer memory allocated for use in the computer based on the amount of available energy in the auxiliary power source; and
allowing the computer to begin moving data normally during a startup operation when the volatile computer memory allocated for use by the computer is limited to a minimum level and the amount of available energy in the auxiliary power source has reached a level capable of powering a transferal of the full contents of the limited volatile computer memory allocated for use by the computer to non-volatile computer memory during a computer shutdown.

12. The method of claim 11, wherein adjusting the amount of volatile computer memory allocated for use in the computer further comprises limiting the amount of volatile computer memory allocated for use by the computer to an amount of volatile computer memory that can be transferred to non-volatile computer memory during a computer shutdown using the amount of available energy in the auxiliary power source.

13. The method of claim 11, further comprising transferring data stored in non-volatile memory to permanent memory upon application of power to the computer.

14. The method of claim 11, wherein adjusting the amount of volatile computer memory further comprises increasing the amount of volatile computer memory for use in the computer above the minimum level after allowing the computer to begin moving data normally and in response to determining the amount of available energy in the auxiliary power source has increased.

15. A computer readable storage medium comprising computer readable code configured to carry out a method for limiting volatile computer memory based on available energy in an auxiliary power source, the method comprising:
determining an amount of available energy in an auxiliary power source;
determining an amount of volatile computer memory allocated for use in a computer;
adjusting the amount of volatile computer memory allocated for use in the computer based on the amount of available energy in the auxiliary power source; and
allowing the computer to begin moving data normally during a startup operation when the volatile computer memory allocated for use by the computer is limited to a minimum level and the amount of available energy in the auxiliary power source has reached a level capable of powering a transferal of the full contents of the limited volatile computer memory allocated for use by the computer to non-volatile computer memory during a computer shutdown.

16. The computer readable storage of claim 15, wherein adjusting the amount of volatile computer memory allocated for use in the computer further comprises limiting the amount of volatile computer memory allocated for use by the computer to an amount of volatile computer memory that can be transferred to non-volatile computer memory during a computer shutdown using the amount of available energy in the auxiliary power source.

17. An apparatus for limiting volatile computer memory based on available energy in an auxiliary power source, the apparatus comprising:
energy means for determining an amount of available energy in an auxiliary power source;
memory means for determining an amount of volatile computer memory allocated for use in a computer;

adjusting means for adjusting the amount of volatile computer memory allocated for use in the computer based on the amount of available energy in the auxiliary power source; and startup means for allowing the computer to begin moving data normally during a startup operation when the volatile computer memory allocated for use by the computer is limited to a minimum level and the amount of available energy in the auxiliary power source has reached a level capable of powering a transferal of the full contents of the limited volatile computer memory allocated for use by the computer to non-volatile computer memory during a computer shutdown.

18. The apparatus of claim 17, further comprising means for limiting the amount of volatile computer memory allocated for use by the computer to an amount of volatile computer memory that can be transferred to non-volatile computer memory during a computer shutdown using the amount of available energy in the auxiliary power source.

* * * * *